United States Patent [19]

Adams, Jr. et al.

[11] Patent Number: 5,444,782
[45] Date of Patent: Aug. 22, 1995

[54] COMPUTER NETWORK ENCRYPTION/DECRYPTION DEVICE

[75] Inventors: Richard L. Adams, Jr., Fairfax, Va.; Peter D. Hallenbeck, Elfland, N.C.

[73] Assignee: UUNET Technologies, Inc., Falls Church, Va.

[21] Appl. No.: 184,631

[22] Filed: Jan. 19, 1994

Related U.S. Application Data

[63] Continuation-in-part of Ser. No. 28,437, Mar. 3, 1993, abandoned.

[51] Int. Cl.[6] .............................................. H04L 9/00
[52] U.S. Cl. .................................... 380/49; 380/9; 380/50
[58] Field of Search .................... 380/9, 20, 21, 23, 25, 380/43, 49, 50

[56] References Cited

U.S. PATENT DOCUMENTS

| | | | |
|---|---|---|---|
| 4,159,468 | 6/1979 | Barnes et al. | 371/53 |
| 4,160,120 | 7/1979 | Barnes et al. | 380/29 |
| 4,182,933 | 1/1980 | Rosenblum | 380/21 |
| 4,203,166 | 5/1980 | Ehrsam et al. | 380/49 X |
| 4,238,854 | 12/1980 | Ehrsam et al. | 380/49 X |
| 4,633,391 | 12/1986 | Rundell | 380/21 X |
| 4,727,579 | 2/1988 | Wright et al. | 380/20 |
| 4,829,569 | 5/1989 | Seth-Smith et al. | 380/10 |
| 4,991,207 | 2/1991 | Shiraishi et al. | 380/9 |
| 5,161,192 | 11/1992 | Carter et al. | 380/9 X |
| 5,222,137 | 6/1993 | Barrett et al. | 380/21 |
| 5,261,003 | 11/1993 | Matsui | 380/50 |

Primary Examiner—Bernarr E. Gregory
Attorney, Agent, or Firm—Heller, Ehrman, White & Mc Auliffe

[57] ABSTRACT

A computer network encryption/decryption device includes at least one microprocessor, microprocessor support hardware, at least two network ports for connecting to upstream and downstream networks, memory hardware for storing program, configuration, and keylist data, and data encryption/decryption hardware. The device operates in one of two modes by selectively encrypting or decrypting packets or portions of packets based on information contained in a packer's header.

45 Claims, 13 Drawing Sheets

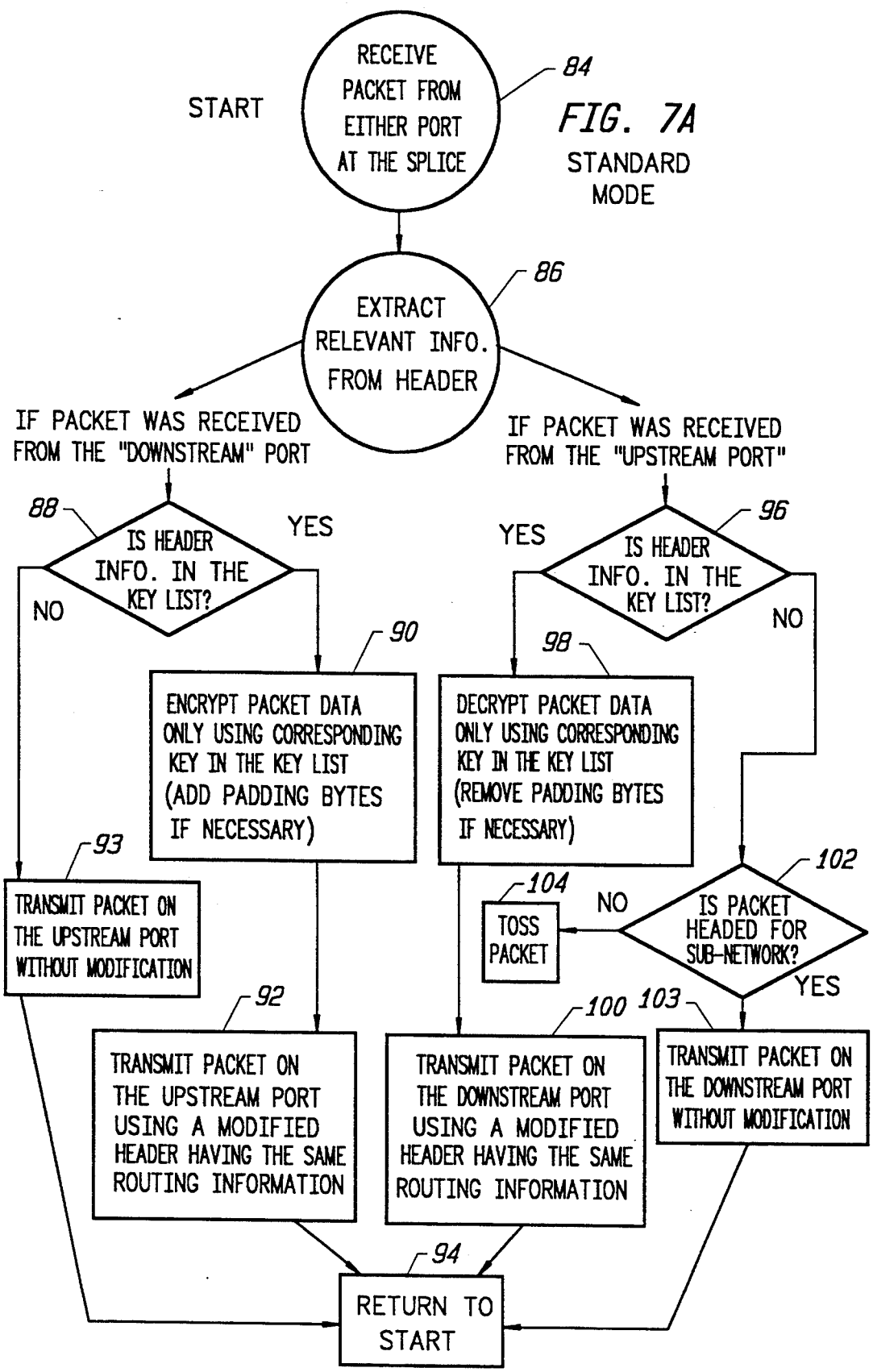

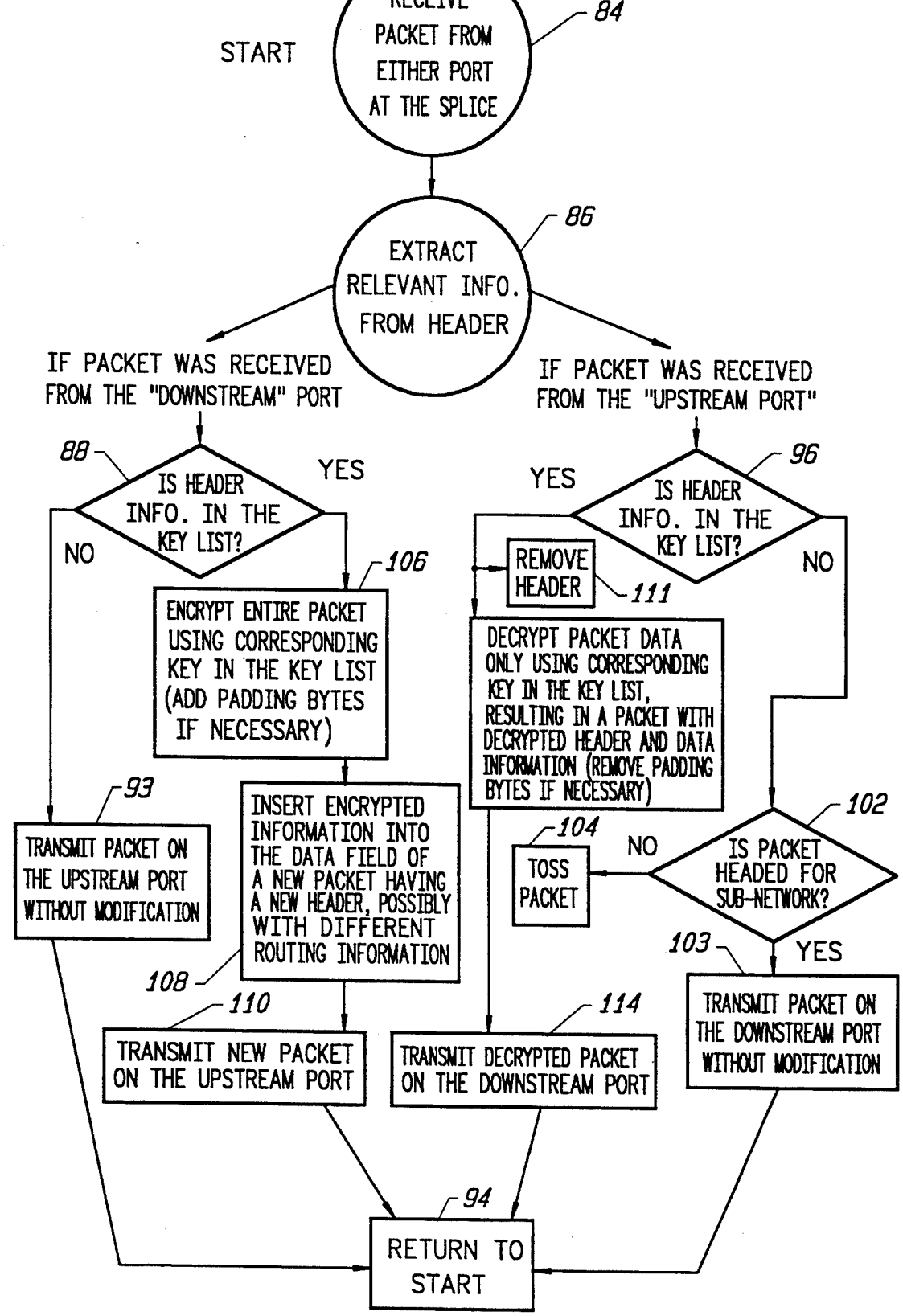

COMPUTER NETWORK ENCRYPTION/DECRYPTION DEVICE

The present application is a continuation-in-part of U.S. patent application Ser. No. 08/028,437, filed Mar. 3, 1993, now abandoned.

BACKGROUND OF THE INVENTION

The present invention relates to computer network communication systems, and more particularly to computer network communication systems wherein the data transmitted between terminals is encrypted.

Computer networks provide a user friendly way by which computer operators can receive data from, or transmit data to remote locations. The process by which a user will interact with a remote location hides the user from the operation of other processes, each of which will accomplish some activity necessary for the transmission of the data. Each of these processes is referred to as a "layer." There are seven layers in the commonly used Open Systems Interconnection (OSI) Reference Model, each of which is listed below:

1. Physical transmission of data to the network (physical layer).
2. Error-free transmission of packets over individual data links (data link layer).
3. Subdivision of files into packets, logging packets over available links, and ordering of received packets (network layer).
4. Mapping of the agreed-on service on the transmission facilities available (transport layer).
5. File and destination identification (session layer).
6. Data translation (presentation layer).
7. User Interface (application layer).

The rules implemented at each end of the transmission or segment of transmission for accomplishment of any one of these or similar activities is called a protocol. Each protocol is expressed in such a way as to hide all lower-layer activities.

Each layer N (where the value of N ranges from 1 to 7 in the OSI Reference Model) provides services to its user, layer N+1. To accomplish this, layer N uses the functions made available to it by layer N−1. For example, network layer 3 provides service to transport layer 4, using functions provided to it by data link layer 2.

The internal structure of these layers above or below layer N are not know by layer N. Each layer includes a process at each end of the transmission and implements the activities necessary to offer and enhance the service to the layer above. The protocol for layer N is a set of rules implemented by the processes at that layer. Control information and data are exchanged across the interface between layers N and N+1. This can be either control for layer N at either end of the transmission or data destined for layer N+1 at the other end. The process, therefore, has two interfaces, one at each layer above and below and one with the corresponding process at the other end of the transmission.

Whatever information is placed in the message (or packet) by one layer of protocol is treated as data by, and is transparent to, lower layers of protocol. At the transmitting end, layer N−1 adds header (and possibly trailer) characters to the packet that will provide control information as needed by the layer N−1 receiving process to implement layer N−1 protocol. Similar header characters may have been added to the packet by layer N. To layer N−1 these header (and trailer) characters are treated just as if they were part of the original packet. If there exists a layer N−2, still another header may be added to the packet as it is passed down to this layer at the transmitting end. Header characters also include routing information necessary to deliver the packet to its intended destination, information about the data contained in the packet, e.g. indicating that the data is part of a file transfer, electronic mail, etc.

There is no single set of protocols used in all networks. Some may use more than the seven layers described here, some fewer.

There are currently many networks in use on various pieces of hardware and with various operating systems. These networks may have differing data transfer rates, size of transmitted packet and other differences which cause compatibility problems. Fortunately, a few standards have evolved which allow these divergent systems to communicate. The development of the Internet Protocol (IP), which usually operates at the network layer, is one of these.

With the advent of the IP, computer systems throughout the world can now communicate with each other. Because of the great distances separating these machines, the physical wiring and interconnections that make up a network's physical layer are not under any given organization's control. In fact, leased lines from telephone companies carry much of the traffic of these networks. This presents security problems because there are many points on any given network that can be tapped, essentially allowing the person tapping into the network to "listen in" to the data transmitted over the lines, or to information such as the source, destination, and type of data contained in a packet.

A solution to these problems would be to encrypt each packet sent over the non-secured lines, preventing unauthorized persons tapped into the signal from understanding the transmission. However, this approach cannot work in open systems like those using the Internet Protocol because routing functions are performed by switches or gateways which are physically distributed along the network. These gateways force all routing information (present in the header portions of a packet) to be in clear, machine-readable Internet Protocol form. They therefore prohibit the encryption of an entire packet before transmission into a communications channel.

Because of the requirement that the routing information contained in the header remain intact, prior attempts to provide secure communications between distant computer systems have focused on encrypting data before it is sent over the network.

For example, users can manually encrypt data, or use a utility program to encrypt data before it is broken up into packets and sent over the network. However, there are three problems with this approach. First, users are required to perform a separate step before each transmission of data, breaking the seamless integration of the network and the operating system. Because of this separate step, users can become lazy or forget to encrypt data before it is sent. Second, this approach is impractical in situations other than simple file transfer where there is repeated interaction between computer systems connected to a network. Manual encryption in these situations is not a viable option because it would slow these network services immensely. Third, even though the data itself may be encrypted, one tapped into the network could still get information from the unencrypted header fields, such as the source, destination, and type of data contained in the packet.

Another method of providing secure communications is to have the operating system encrypt and decrypt all data coming in and out. While this solves the problem of forgetful or lazy users, it creates another one: the system can only communicate with like systems. Different systems or networks cannot communicate. In addition, an operating system upgrade is required to secure the communications, and information contained in the unencrypted header fields can still be understood by one tapped into the network.

Yet another approach to providing security is to physically confine the network to prevent unauthorized access. However, typically only the military has the resources to own and confine a physically large network, and in so doing they eliminate the advantages of tying into the outside world.

On a smaller scale, some systems attempt to encrypt all packets and thus define a sub-network. However, the end result will typically have one of two flaws: either the users are deprived of a robustness and utility of the network and thus are constrained as if they were not connected to the network at all, or security is compromised if access to the entire network is allowed. In general, all of these solutions to the problem of providing secure communications eliminate much of the functionality which make networks useful in the first place.

Accordingly, it is an object of the present invention to provide transparent, secure communications between computer systems or LANs connected to an open network, while allowing full access to other computer systems or LANs connected to the open network.

Additional objects, advantages and novel features of the present invention will be set forth in part in the description which follows and in part become apparent to those skilled in the art upon examination of the following, or may be learned by practice of the invention. The objects and advantages of the invention may be realized and attained by means of the instrumentalities and combinations which are pointed out in the appended claims.

SUMMARY OF THE INVENTION

The present invention is directed to a device for encrypting and decrypting data transmitted between computer systems or local area networks (LANs) connected to an open computer network. In one preferred embodiment, the device includes a high performance microprocessor for examining routing information and directing packets that flow through the device, memory for storing routing information, encryption and decryption hardware for encrypting and decrypting data, support peripherals to support the operation of the microprocessor and integrate the device into the network, and two network interface ports for interfacing with the existing network. Both of the network interface ports have the same port address.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 7A is a flow chart showing the algorithm followed by the present invention when operating in the standard mode.

FIG. 7B is a flow chart showing the algorithm followed by the present invention when operating in the tunnelling mode.

DETAILED DESCRIPTION OF THE INVENTION

Figure 1:
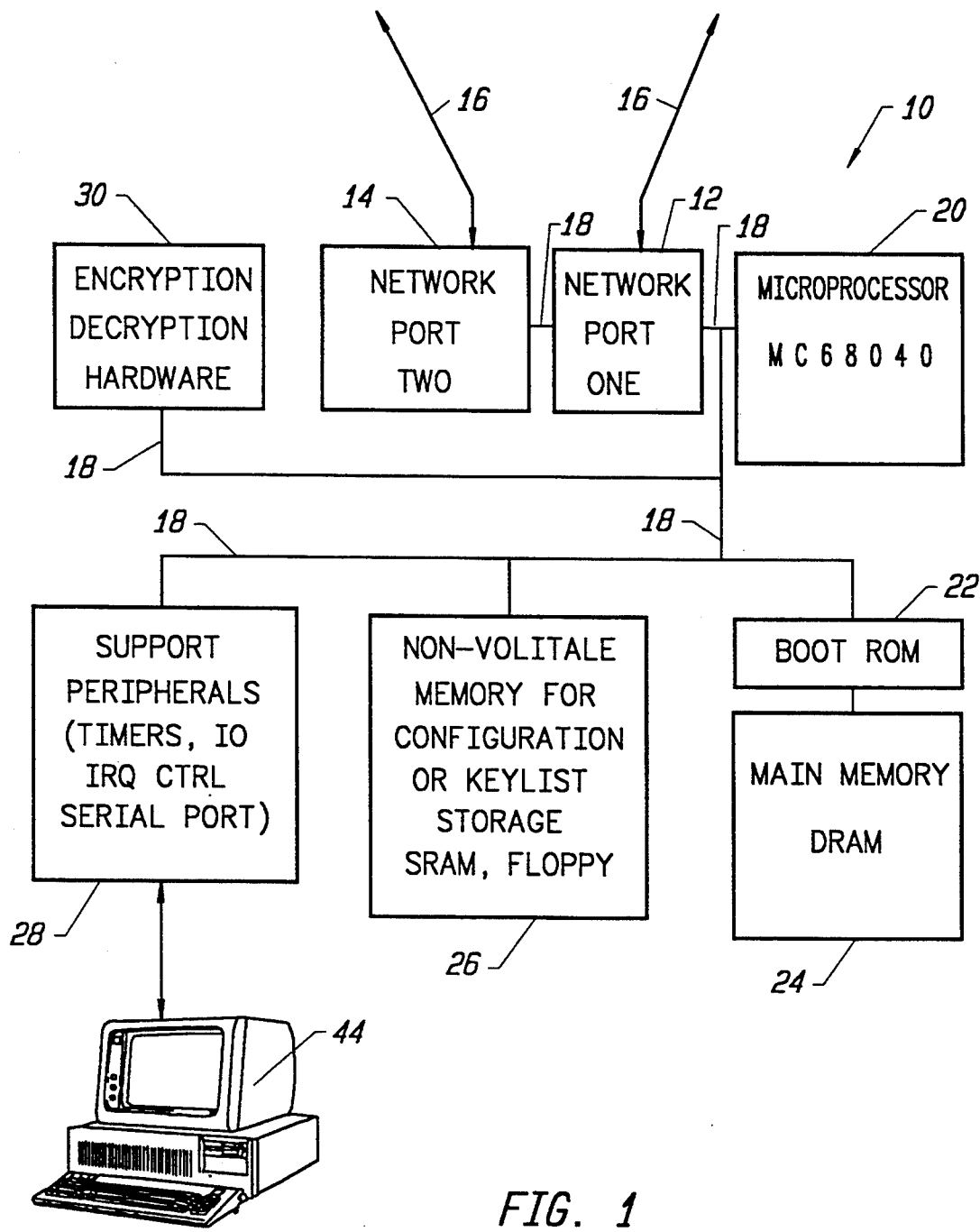
FIG. 1 is a block diagram showing the interconnection of major components according to the present invention.

Reference will now be made in detail to a preferred embodiment of the invention, an example of which is illustrated in the accompanying drawings. While the invention will be described in conjunction with that preferred embodiment, it will be understood that it is not intended to limit the invention to one preferred embodiment. On the contrary, it is intended to cover alternatives, modifications and equivalents as may be included within the spirit and scope of the invention as defined by the appended claims.

Since all networks use a layered approach, the most common of which is a variant of the OSI Reference Model, the correct layer must be used to implement the security. Going too far "down" in the layers removes the routing information needed for the distributed routing approach many networks use. In the Internet systems, the layer at which IP packets are sent is the best layer to insert this invention, because this layer is transparent to and independent of both the users and application programs, and the underlying hardware.

The present invention is spliced into the lines of a local area network so that it may intercept all packets flowing into or out of the LAN at the correct layer. In one mode of operation, the present invention will encrypt or decrypt only the data portion of a packet, the act of encrypting or decrypting being dependent upon the contents of the header portion of the packet.

In another mode of operation, the present invention will encrypt both the header and data characters of an original packet, and insert this encrypted information into the data field of a new packet with a new, unencrypted header possibly including different routing information. Similarly, the present invention will decrypt the data field of a packet to regenerate the header and data characters of an original packet. Again, the act of encrypting or decrypting is dependent on the contents of the header portion of the received packet.

Because the present invention is spliced into the lines of a LAN, it can be added without any changes to the existing LAN. Most sites have a single link to the outside or non-local part of the network. Inserting the security invention at this point makes the sub-network below the present invention secure. In addition, the network ports may or may not be configured such that the device is transparent to the existing LAN.

The present invention maintains a table. This table includes a list of site, destination, port, or other information that may be present in a header to make a routing or encryption/decryption decision. The table also includes handling instructions, to determine whether to encrypt, decrypt, pass through, or discard ("toss") packets passing through the device. There may also be included in the tables information needed to allow for the tunnelling of information through a network to a similar device. Also included in the table are keys for encrypting and decrypting information. There is a mechanism which allows the administrator of a sub-network to maintain a list of sites and encryption keys associated with those sites. The encryption keys can also be public encryption keys, such as those patented by RSA Data Security of Redwood City, Calif., or can be a secret Data Encryption Standard (DES) key.

This device allows any number of sub-networks to communicate between themselves in a secure fashion over a public network, such as the Internet, yet allows full access to all other sites on the network. Installation requires no changes to the underlying system. Per site key tables allow control and generation of a hierarchy of security which is controlled by the site administrators.

Referring now to the drawings wherein like components are designated by like reference units, FIG. 1 illustrates a preferred embodiment of a Computer Network Encryption/Decryption Device (CNEDD) according to the present invention. The CNEDD is designated by general reference numeral 10.

CNEDD 10 has a first network port 12 and a second network port 14 spliced into existing network transmission medium 16. First network port 12 and second network port 14 both have the same network address. For reasons to be described below, first network port 12 will be referred to as the "upstream" port, and second network port 14 will be referred to as the "downstream" port. As will be shown below, upstream port 12 and downstream port 14 can be connected to different types of network transmission media, depending on the placement of CNEDD 10 into the existing networks.

Electrically connected to network ports 12 and 14 via data bus 18 is a high speed microprocessor 20, such as the Motorola MC 68Q40. Microprocessor 20 is also electrically connected, via data bus 18, to boot Read Only Memory (ROM) 22 for initializing microprocessor 20, main memory 24 for the use of microprocessor 20, non-volatile memory for the storage of keylist and configuration data 26, support peripherals 28 for supporting the operation of microprocessor 20 and for connecting CNEDD to control terminal 44, control terminal 44 for controlling or changing the keylist, and encryption/decryption hardware 30 for encrypting and decrypting information.

Figure 2:
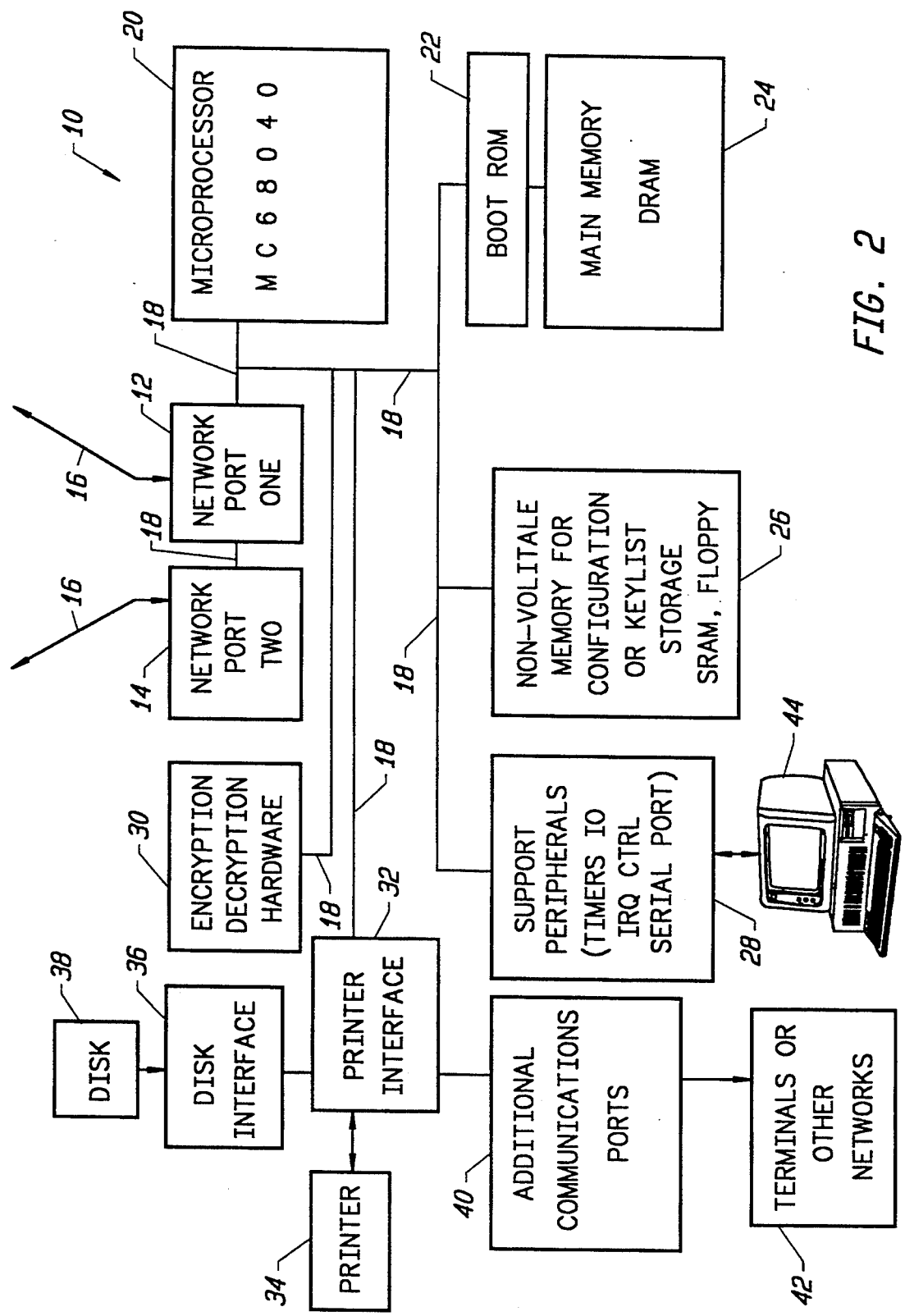
FIG. 2 is a block diagram of the invention showing additional features including a disk interface, a printer interface, and additional communications ports.

Referring now to FIG. 2, an alternative embodiment of CNEDD 10, Microprocessor 20 is also electrically connected, via data bus 18, to printer interface 32 for connecting to external printer 34, disk interface 36 for connecting to external disk drive 38, and additional communications ports 40 for connecting to external terminals or other networks 42. It will be apparent to those skilled in the art that many of the functions provided by the elements shown in FIGS. 1 and 2 can be combined onto one or more integrated circuits.

Figure 3:
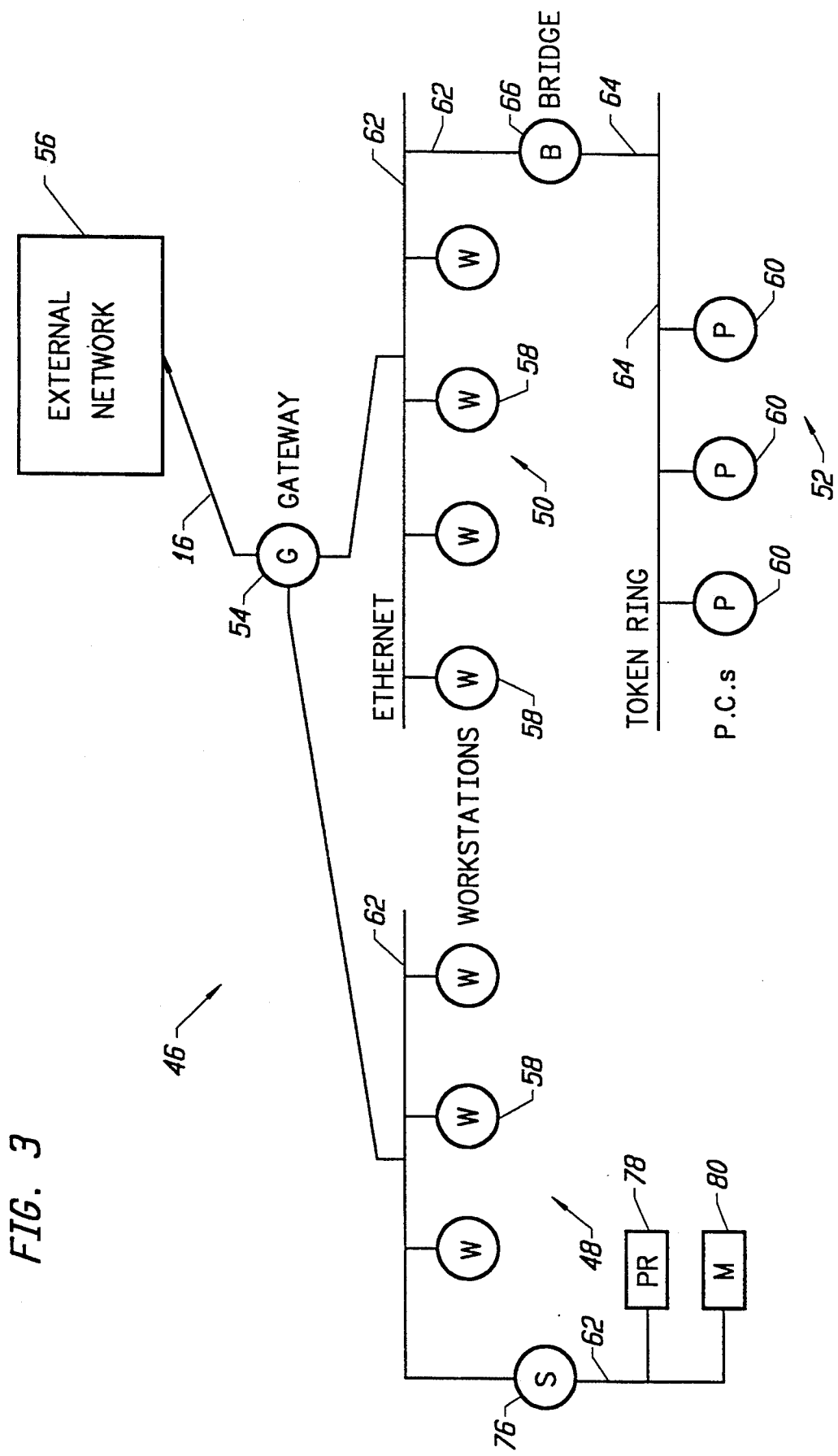
FIG. 3 is a block diagram showing a typical arrangement and interconnection of computers in a plurality of computer networks.

Referring now to FIG. 3, a typical arrangement and interconnection of computers in a computer network 46 is shown. Sub-networks 48, 50, and 52 connect to gateway 54. Gateway 54 is, in turn, connected via network transmission medium 16 to external network 56.

Sub-networks 48 and 50 might be Ethernet networks connecting together workstations 58 via Ethernet transmission medium 62. Sub-network 52 might be a token ring network connecting together personal computers 60 via token ring transmission medium 64.

Token ring sub-network 52 might be connected to Ethernet sub-network 48 or 50 via network bridge 66. Also shown in sub-network 48 is a device 76. Device 76 might perform such functions as file serving, printer spooling, remote system backup, modem serving, or other functions to be described further below. Attached to device 76 via Ethernet transmission medium 62 are printer 78 and modem 80 for the use of sub-network 48. The connection to external network 56 via gateway 54 is typically a serial network protocol such as High-Level Data Link Control (HDLC) operating at a rate between 64 thousand and 2 million bits per second.

Figure 4A:
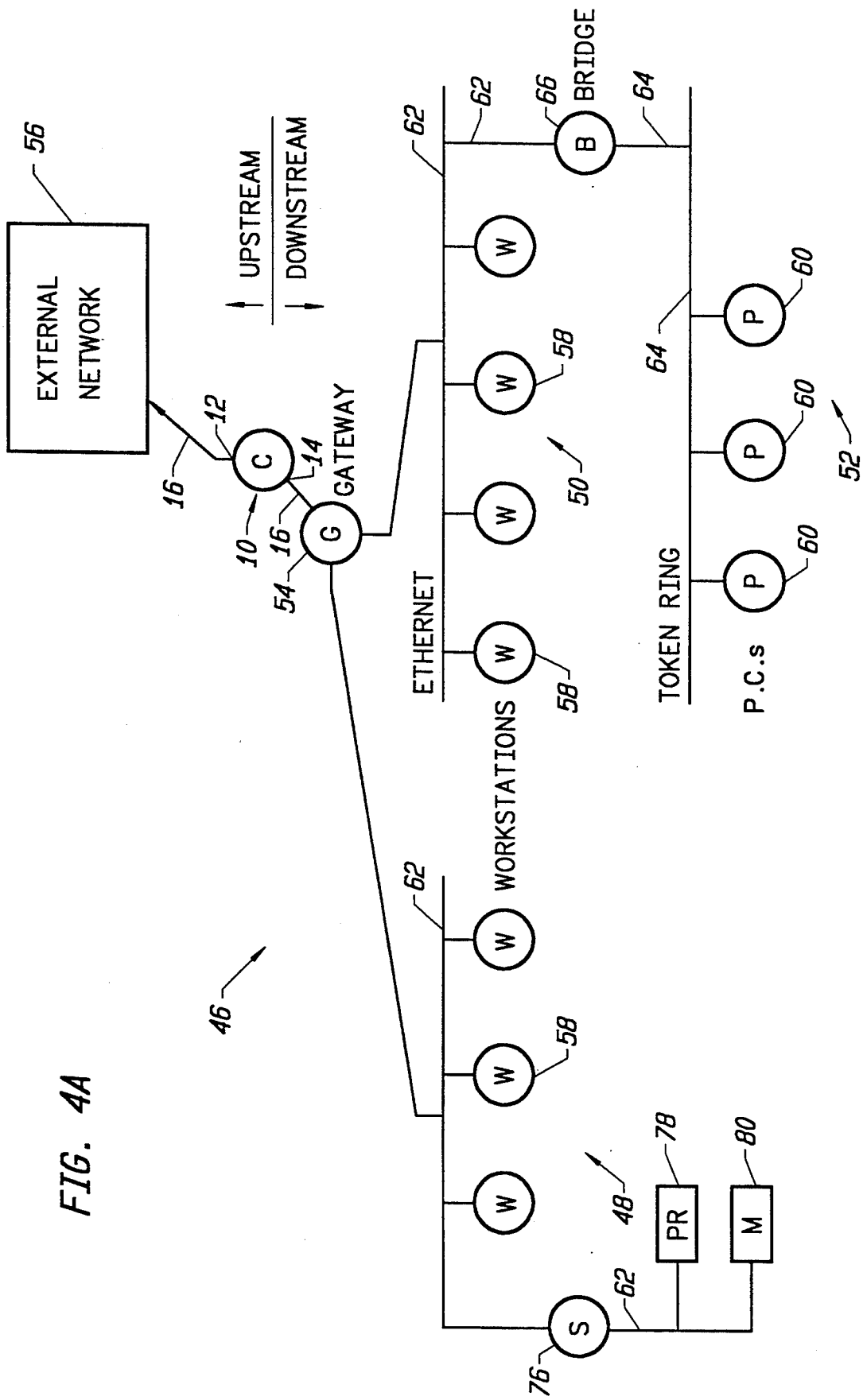
FIG. 4A is a block diagram showing a placement of the present invention in the networks of FIG. 3.

FIG. 4A shows the sub-networks of FIG. 3 with the addition of CNEDD 10 spliced into the serial data stream between gateway 54 and external network 56. As is shown in FIG. 4A, data flowing to or coming from external network 56 is referred to as "upstream" data. Similarly, data flowing to or coming from subnetwork 46 is referred to as "downstream" data. Accordingly, upstream network port 12 is connected to network transmission medium 16 leading to external network 56, and downstream network port 14 is connected to network transmission medium 16 leading to gateway 54.

Figure 8:
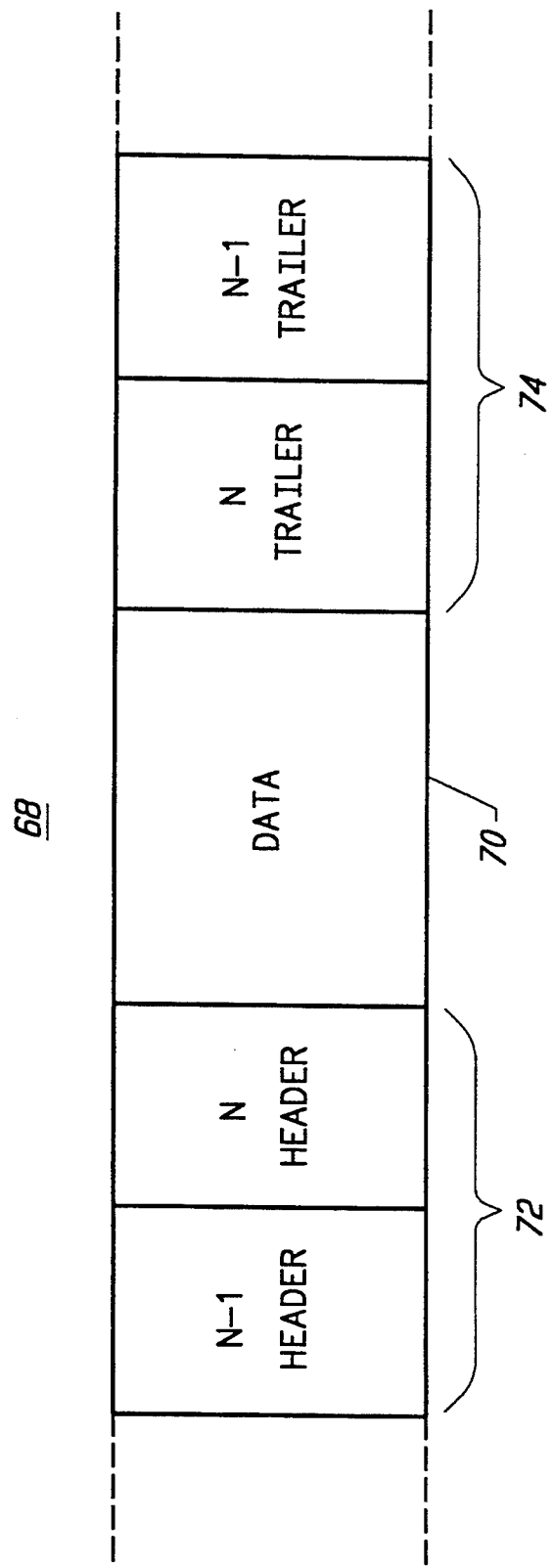
FIG. 8 is a schematic representation of the organization of a packet sent through a network.

CNEDD 10 examines each packet 68 flowing into or out of sub-network 46. As was mentioned above, each packet includes data characters 70, header characters 72, and possibly trailer characters 74 inserted by the various network layers (see FIG. 8). Included in header characters 72 are information about the source and destination of packet 68, checksums for data characters 70 and header characters 72, as well as options bits containing information about the data being transferred in packet 68. For example, an option bit or bits in header characters 72 might indicate that data characters 70 are encrypted, or that data characters 70 are part of a file transfer.

CNEDD 10 can operate in either a standard mode or a tunnelling mode. In the standard mode, only the data field of a packet 68 is encrypted, and a new packet is transmitted which includes an unencrypted header (with the original routing information) and the encrypted data. In the tunnelling mode, both the data characters and the header characters of an original packet are encrypted. This encrypted information is then placed in the data field of a new packet with a new header. This new header includes all of the routing information needed to deliver the new packet to its intended destination. Both of these modes will be described further below.

Referring now to FIGS. 1, 4A, 4B and 7A, the operation of CNEDD 10 in the standard mode will be described. In the standard mode, CNEDD 10 operates to encrypt data by receiving a packet 68 from downstream network port 14 (FIG. 7A, step 84). CNEDD 10 then uses microprocessor 20, support peripherals 28, and main memory 24 to extract destination or other relevant information contained in header 72 (step 86). The information extracted from header 72 is temporarily stored in microprocessor 20 or main memory 24. CNEDD 10 then compares the information from header 72 with a table, or key list, stored (while CNEDD 10 is operating) in memory 24 (step 88).

There are typically three separate elements to the key list structure. The first element, the matching criteria, contains a list of source addresses, destination addresses, and other information that could be found in header characters 72.

The second element might contain a plurality of keys used to encrypt and decrypt information. Finally, the third element in the key list includes handling instructions for each packet 68 passing through CNEDD 10. Depending on how information in header characters 72 matches the matching criteria, information may be encrypted, decrypted, otherwise modified, passed through without modification, or packet 68 may be tossed (deleted).

This key list is stored in non-volatile memory 26 when CNEDD 10 is not operating, and can be modified or replaced by the operator of CNEDD 10 through control terminal 44. In addition, the key list could be changed by access through another terminal on network 46, or through the use of public key access techniques.

There are several methods by which information in header characters 72 can be compared with information stored in the keylist. In a preferred embodiment, a series of masks can be used to compare significant portions of the header information with information in the key list. For example, it might be desired to encrypt all packets sent to a particular sub-network. Because certain portions of the addresses of the terminals in that sub-network would be identical (the portion identifying the terminal as belonging to the sub-network), the other, more specific portions of the address could be masked, and thus not included in the comparison. This reduces the amount of information that must be compared to get a match (a "hit") on the keylist, and reduces the time needed to implement the appropriate handling instruction.

In addition to the mask described above, a series of other masks can be used. Handling instructions can be dependent upon which mask is used when a hit is recorded. For example, a second mask might mask out all bits in an address, which would always result in a hit on the keylist. The handling instruction associated with a hit obtained with the second mask might be to pass information through without encrypting or decrypting it.

If a comparison of the information extracted from header 72 the with the information stored in the key list indicates that data 70 should be encrypted, CNEDD 10 encrypts data 70 using encryption/decryption hardware 30 and a key stored in main memory 24 corresponding to the destination or other characteristics of packet 68 (step 90). If DES encryption is used, the amount of information to be encrypted per packet must be in multiples of 8 bytes. That is, the length of data characters 70 must be either 8, 16, 32, etc. bytes long for the DES encryption to be performed properly. If the amount of information to be encrypted is not a multiple of 8 bytes, "padding" bytes are added to increase the length of the information block before encryption takes place. This use of padding bytes is well known to those skilled in the art.

After data 70 has been encrypted, packet 68 is reconstructed. Header characters 72 will be modified to conform to the changes made in data characters 70. Option bits may be used to indicate that data characters 70 have been encrypted, or to indicate that a particular number of padding bytes have been used in the encryption. New checksums for data Characters 70 and header characters 72 must be computed and inserted in header characters 72. However, all routing information found in header characters 72 indicating the source and destination of packet 68) is unchanged. Similar changes may also be made to trailer characters 74. Packet 68, including modified header characters 72 and encrypted data 70 is then transmitted upstream to external network 56 via upstream network port 12 (step 92), and CNEDD 10 prepares to receive another packet (step 94).

If a comparison of the information stored in header 72 with the key list stored in main memory 24 indicates that the packet should be passed through without modification, data 70 is not modified in any way and packet 68 is then transmitted, unmodified, upstream to external network 56 via upstream network port 12 (step 93), and CNEDD 10 prepares to receive another packet (step 94).

In the standard mode, CNEDD 10 operates to decrypt information by receiving a packet 68 from upstream network port 12 (step 84). CNEDD 10 then uses microprocessor 20, support peripherals 28, and main memory 24 to extract source information or other information from header 72 (step 86). The information extracted from header 72 is then temporarily stored in microprocessor 20 or main memory 24. Next, CNEDD 10 compares the information extracted from header 72 with a table, or key list stored in main memory 24 (step 96).

If a comparison of the information extracted from header 72 the with the information stored in the key list indicates that the data should be decrypted (and any padding bytes removed after the decryption), CNEDD 10 decrypts data 70 using encryption/decryption hardware 30 and a key stored in main memory 24 corresponding to the source or other characteristics of packet 68 (step 98).

After data 70 has been decrypted, packet 68 is reconstructed. Header characters 72 will be modified to conform to the changes made in data characters 70. New checksums for data characters 70 and header characters 72 must be computed and inserted in header characters 72. However, all routing information found in header characters 72 (indicating the source and destination of packet 68) is unchanged. Similar changes may also be made to trailer characters 74. Packet 68, including modified header characters 72 and decrypted data 70, is then transmitted downstream to network 46 via downstream network port 14 (step 100), and CNEDD 10 prepares to receive another packet (step 94). Alternatively, if packet 68 is addressed to CNEDD 10, CNEDD 10 may simply use the decrypted data without transmitting a reconstructed packet on its downstream port.

If a comparison of the information stored in header 72 with the key list stored in main memory 24 does not produce a match, data 70 is not decrypted.

If a comparison of the destination information stored in header 72 with the key list stored in main memory 24 indicates that the packet should be tossed (step 102), as may occur if packet 68 is not destined for any node in network 46, packet 68 is not transmitted to downstream port 14 (step 104). Otherwise, packet 68 is then transmitted, unmodified, downstream to network 46 via downstream network port 12 (step 103), and CNEDD 10 prepares to receive another packet (step 94).

Referring now to FIGS. 1, 4A, 4B and 7B, the operation of CNEDD 10 in the tunnelling mode will be described. In the tunnelling mode, CNEDD 10 operates to encrypt data by receiving a packet 68 from downstream network port 14 (FIG. 7B, step 84). CNEDD 10 then uses microprocessor 20, support peripherals 28, and main memory 24 to extract destination or other information contained in header 72 (step 86). The information extracted from header 72 is temporarily stored in microprocessor 20 or main memory 24. CNEDD 10 then compares the information from header 72 with a table, or key list, stored (while CNEDD 10 is operating) in memory 24 (step 88). The comparison method described above with respect to the standard mode are also used with the tunnelling mode.

If a comparison of the information extracted from header 72 the with the information stored in the key list indicates that the packet should be encrypted, CNEDD 10 encrypts the entire packet 68 using encryption/decryption hardware 30 and a key stored in main memory 24 corresponding to the destination or other characteristics of packet 68 (step 106). Padding bytes are added if necessary.

Figure 9:
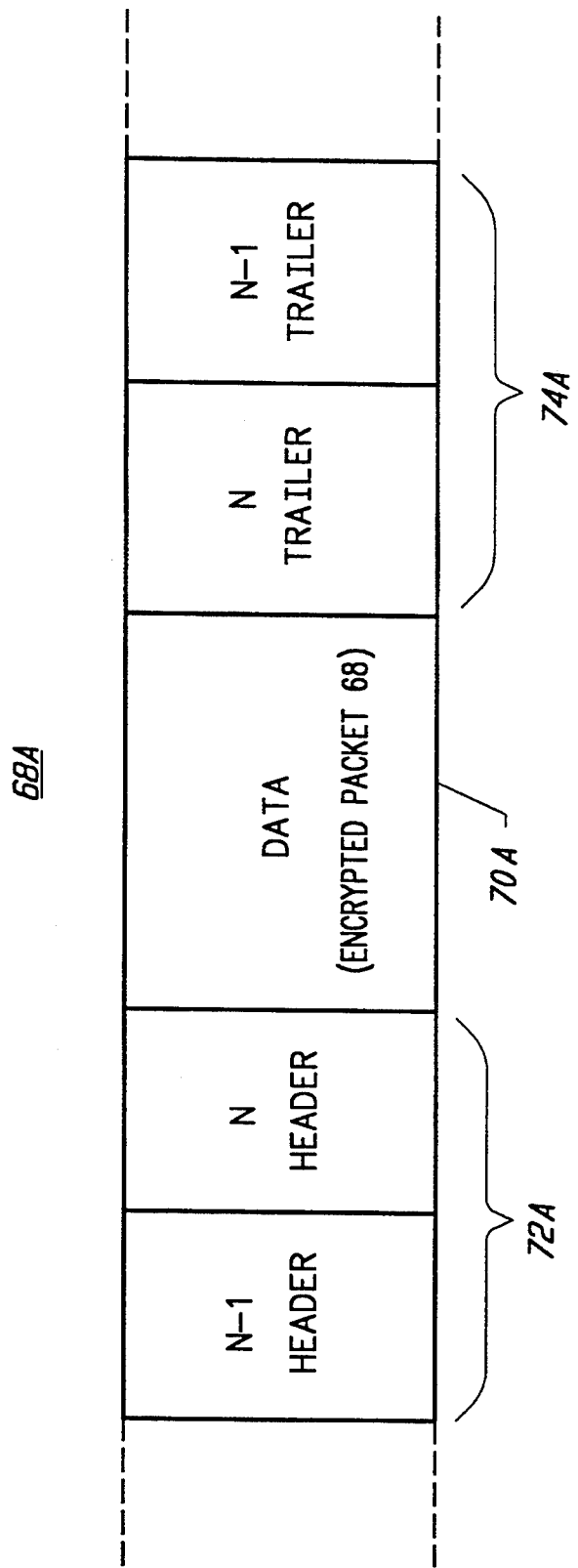
FIG. 9 is a schematic representation of the organization of a packet used by the present invention when operating in the tunnelling mode.

After packet 68 has been encrypted, a new packet 68A (see FIG. 9) is constructed. Data field 70A of new packet 68A contains the encrypted data packet 68. Header characters 72A are generated to conform to data field 70A (step 108). I.e., option bits may be used to indicate that data characters 70A have been encrypted, or to indicate that a particular number of padding bytes have been used in the encryption. Checksums for data characters 70A and header characters 72A must be computed and inserted in header characters 72A. Similar changes may also be made to trailer characters 74A. Packet 68A, including new header characters 72A and encrypted data 70A is then transmitted upstream to external network 56 via upstream network port 12 (step 110), and CNEDD 10 prepares to receive another packet (step 94).

Preferably, header characters 72A do not include information about the type of data contained in packet 68A. In addition, the routing information included in original data packet 68 may be modified. Routing information usually identifies the precise node which generated a packet, and the precise node to which the packet is addressed. However, this source and destination information can be used by one tapped into the network to decipher the nature of the information transmitted.

Accordingly, it is preferred that new header characters 72A indicate that the source of the packet is CNEDD 10, and the destination of the information is a CNEDD 10 the network which contains the intended target node. As will be discussed further below, the CNEDD which receives a packet 68A will generate the original packet 68 from the encrypted data 70A.

If a comparison of the information stored in header 72 with the key list stored in main memory 24 indicates that the data should be passed through without modification, data 70 is not modified in any way and packet 68 is then transmitted, unmodified, upstream to external network 56 via upstream network port 12 (step 93), and CNEDD 10 prepares to receive another packet (step 94).

In the tunnelling mode, CNEDD 10 operates to decrypt information by receiving a packet 68A from upstream network port 12 (step 84). CNEDD 10 then uses microprocessor 20, support peripherals 28, and main memory 24 to extract source information or other information from header 72A (step 86). The information extracted from header 72A is then temporarily stored in microprocessor 20 or main memory 24. Next, CNEDD 10 compares the information extracted from header 72A with a table, or key list stored in main memory 24 (step 96).

If a comparison of the information extracted from header 72A the with the information stored in the key list indicates that data 70A should be decrypted (and any padding bytes removed after the decryption), header 72A is removed (step 111), and CNEDD 10 decrypts data 70A using encryption/decryption hardware 30 and a key stored in main memory 24 corresponding to the source or other characteristics of packet 68A (step 112). Decryption of data 70A results in a packet 68 having a decrypted header 72 and decrypted data 70.

After data 70A has been decrypted to generate packet 68, packet 68 is then transmitted downstream to network 46 via downstream network port 14 (step 114), and CNEDD 10 prepares to receive another packet (step 94). Alternatively, if packet 68 is addressed to CNEDD 10, packet 68 may simply use the data contained in packet 68 without transmitting a reconstructed packet on its downstream port.

If a comparison of the information stored in header 72A with the key list stored in main memory 24 does not produce a match, data 70A is not decrypted.

If a comparison of the destination information stored in header 72A with the key list stored in main memory 24 indicates that the packet should be tossed (step 102), as may occur if packet 68A is not destined for any node in network 46, packet 68 is not transmitted to downstream port 14 (step 104). Otherwise, packet 68A is then transmitted, unmodified, downstream to network 46 via downstream network port 12 (step 103), and CNEDD 10 prepares to receive another packet (step 94).

Figure 4B:
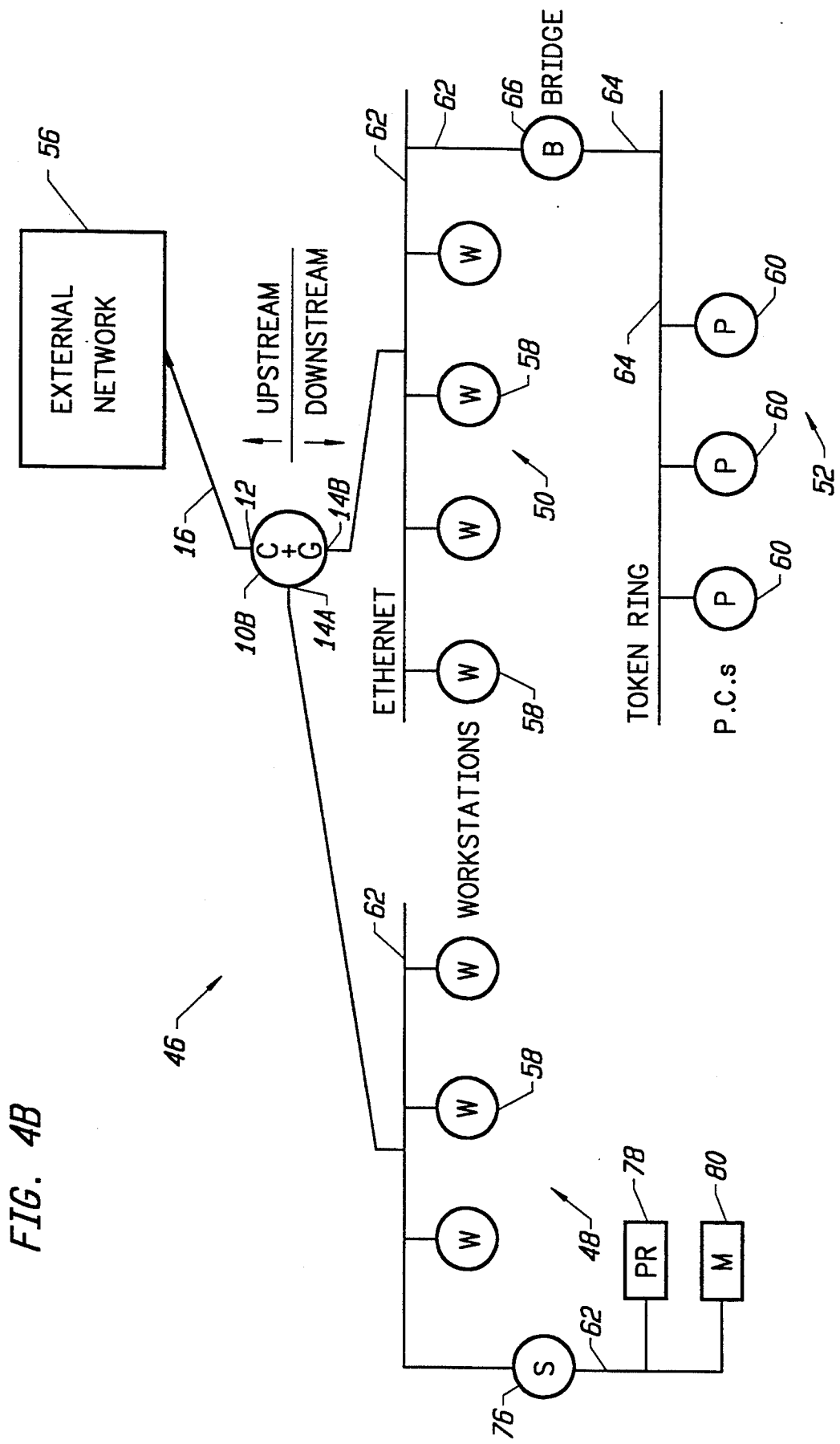
FIG. 4B is a block diagram showing a placement of the present invention in the networks of FIG. 3 wherein the functions of the invention and a gateway are combined in a single unit.

FIG. 4B shows the sub-networks of FIG. 3 with the addition of combined gateway and CNEDD 10B spliced into the data stream between network 46 and external network 56. Combined gateway and CNEDD 10B has a single upstream data port 12, and can have multiple downstream data ports. FIG. 4B shows two downstream data ports, 14A and 14B.

Operation of combined gateway and CNEDD 10B is identical to that described above with respect to separate gateway 54 and CNEDD 10. However, combined gateway and CNEDD 10B offers distinct advantages over the separate components. For example, combining the functionality of a CNEDD and a gateway in a single device would be less expensive than having separate devices perform the same functions. In addition, combined gateway and CNEDD 10B offers a performance advantage by causing less delay in communications with other networks because packets need only be received and retransmitted once instead of twice.

Figure 5A:
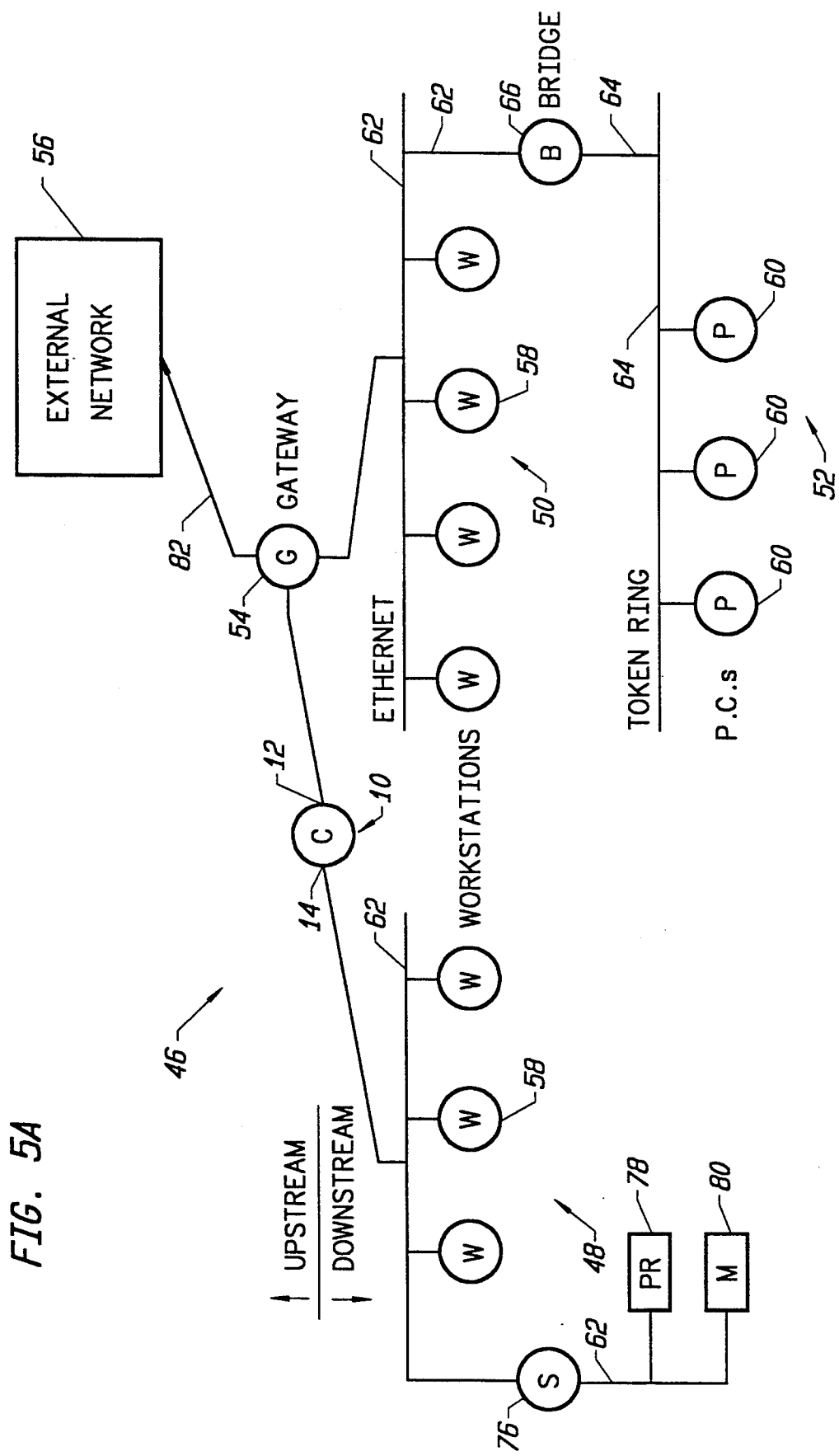
FIG. 5A is a block diagram showing an alternative placement of the present invention in the networks of FIG. 3.

FIG. 5A shows the sub-networks 46 of FIG. 3 with the addition of CNEDD 10 spliced into the serial data stream between sub-network 48 and gateway 54. This provides sub-network 48 with the same encryption/decryption services described above with respect to FIG. 4A, without affecting the rest of network 46.

Figure 5B:
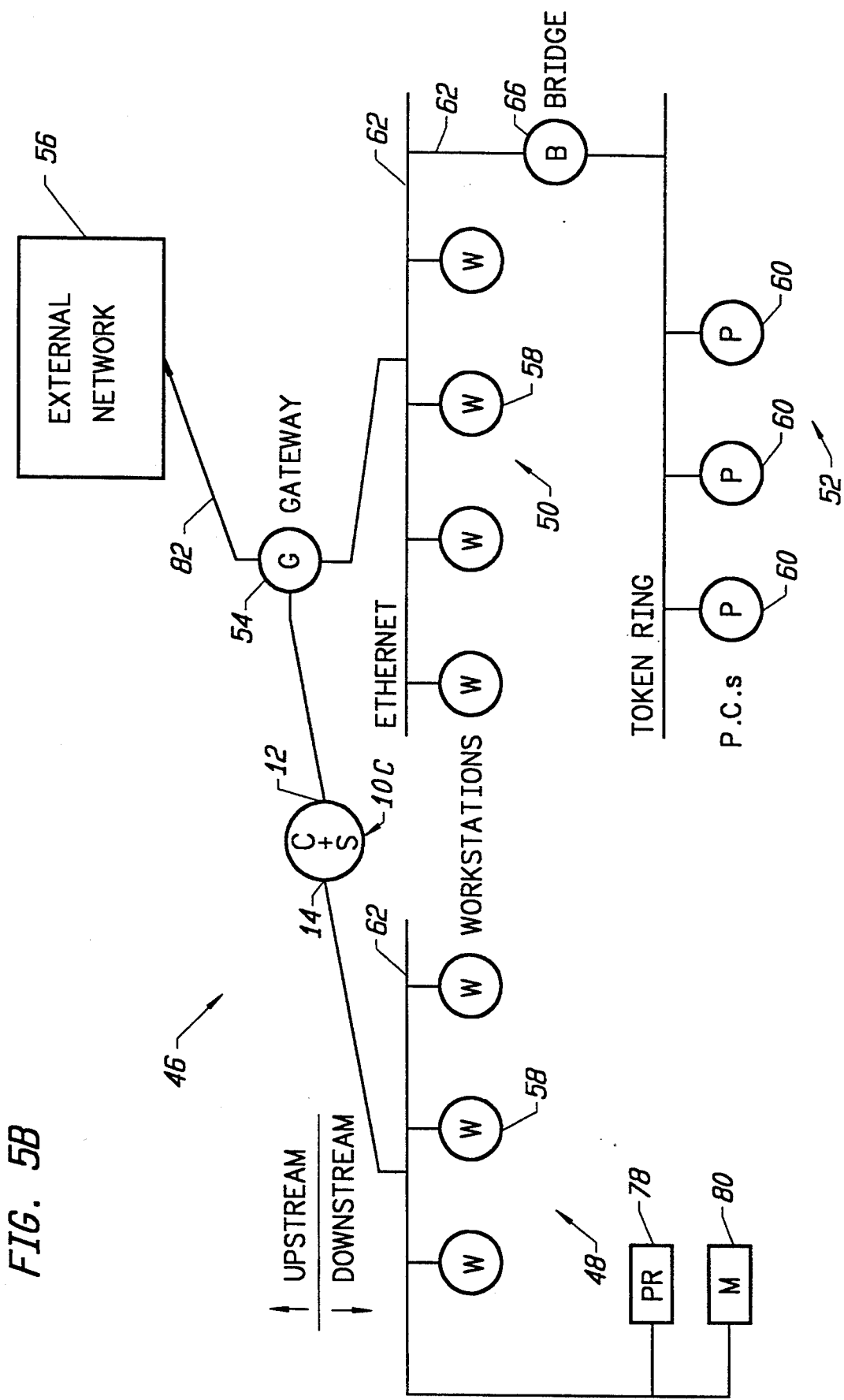
FIG. 5B is a block diagram showing an alternative placement of the present invention in the networks of FIG. 3 wherein the functions of the invention and a sub-network device are combined in a single unit.

FIG. 5B shows the sub-networks 46 of FIG. 3 with the addition of combined device and CNEDD 10C spliced into the serial data stream between sub-network 48 and gateway 54. This provides sub-network 48 with the same encryption/decryption services described above with respect to FIG. 5A, without affecting the rest of network 46.

Combined device and CNEDD 10C combines the functions of CNEDD 10 with one or more of the functions provided by a device 76 (see FIG. 3). It will be apparent to those skilled in the art that a CNEDD can be incorporated into virtually any device, such as a router, a media adaptor unit (MAU), a printer, a printer spooler, a modem, a modem spooler, a workstation, a personal computer, a laptop computer, a multiport repeater, a microrepeater, a network concentrator, a network multiplexer, an internetwork adaptor, a network bridge, a network repeater, a terminal, an X windows terminal, a disk drive, a CD ROM drive, a tape drive, a keyboard, a piece of testing or monitoring equipment, a file server, or a remote system backup device. Combined device and CNEDD 10C allows secure transmission of files from remote locations to printer 78 or modem 80.

While combined device and CNEDD 10C provides the same functionality as device 76 and CNEDD 10 (see FIG. 5A), there is an economic advantage to combining the functions in one device when increasing the capacity of an existing sub-network or installing a new sub-network.

Figure 6:
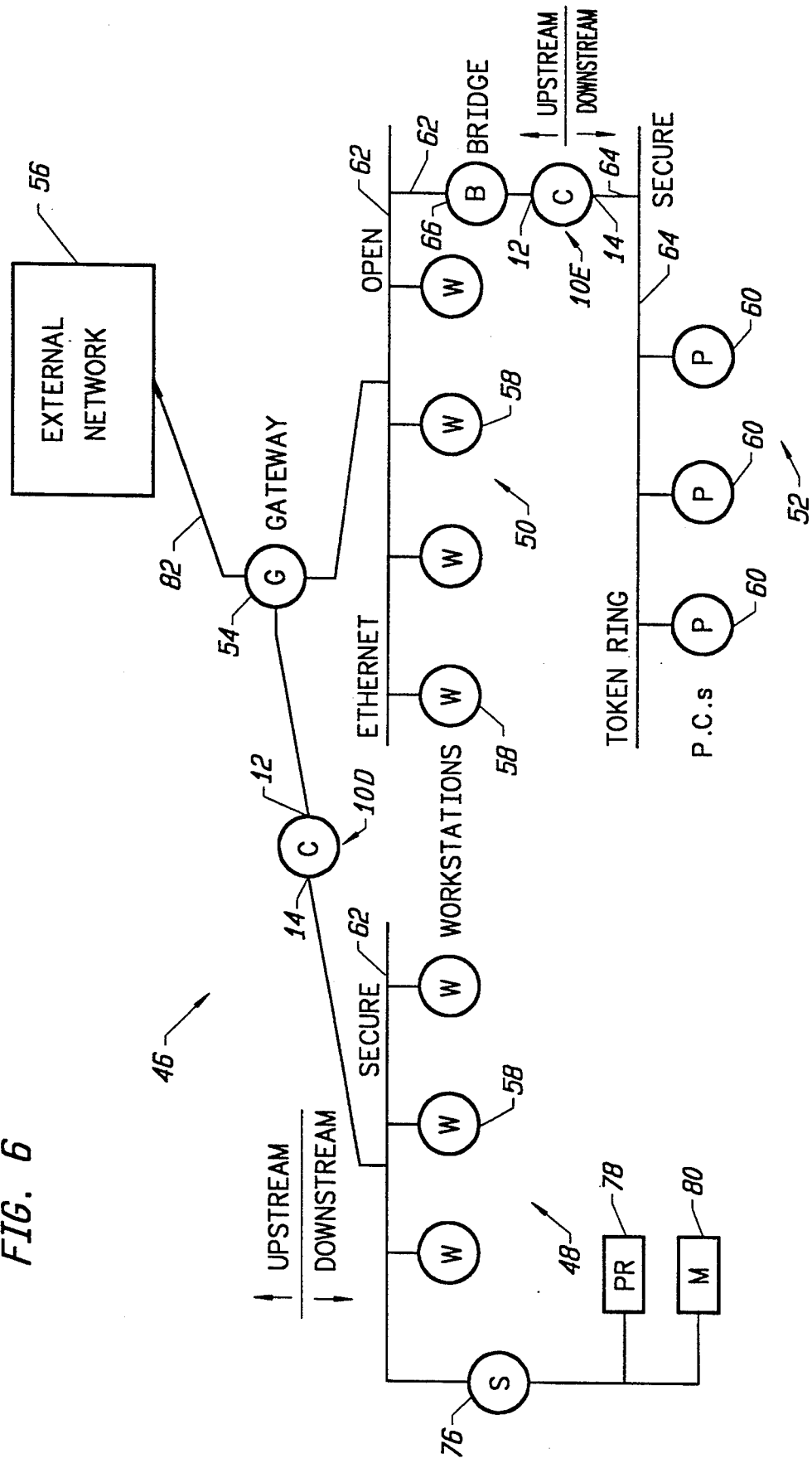
FIG. 6 is a block diagram showing other alternative placements of the present invention in the networks of FIG. 3.

FIG. 6 shows the sub-networks 46 of FIG. 3 with the addition of two CNEDDs 10D and 10E. CNEDD 10D is spliced into the serial data stream between sub-network 48 and gateway 54, in a manner identical to that described in FIG. 5A. CNEDD 10E is spliced into the network transmission medium between sub-network 52 and bridge 66. This configuration allows for secure communications between sub-networks 52 and 48, as well as to external network 56. This might be useful where it is not possible to physically confine the network transmission medium between sub-networks 52 and 48, or where users of sub-network 50 are not given access to confidential information in sub-networks 52 and 48.

Figure 10:
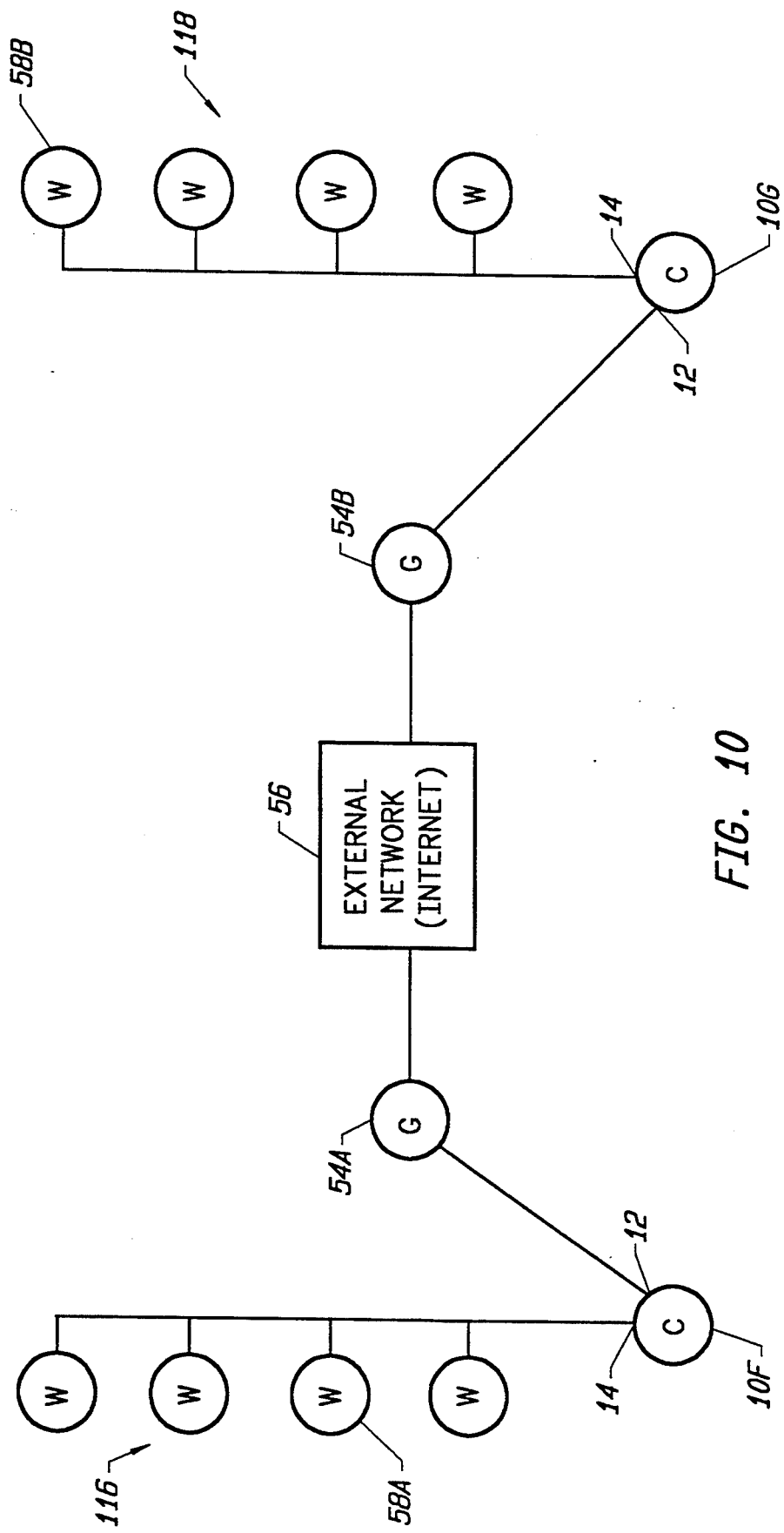
FIG. 10 is a block diagram of two separate networks which can communicate via the Internet.

Referring now to FIG. 10, a schematic diagram of two physically separated networks communicating via the Internet is shown. The tunnelling mode described above not only allows more secure communications between networks which generate IP packets, but it also allows non-IP compatible, physically separate networks to communicate securely over the Internet. For example, workstation 58A on non-IP network 116 may wish to communicate with workstation 58B on non-IP network 118.

CNEDD 10F on network 116 will receive a packet 68 (see FIG. 8) generated by workstation 58A and addressed to workstation 58B. CNEDD 10F will recognize that workstation 58B is part of network 118, and encrypt the packet as described above. Alternatively, CNEDD 10F could examine packet 68 to determine what kind of network packet it is (e.g., Apple, Novel, IPX, etc.) and therefore determine to which separate network the packet should be addressed. CNEDD 10F would then encrypt the packet as described above.

Encrypted packet 68 is then placed into the data field of an IP compatible packet 68A (see FIG. 9), addressed to CNEDD 10G on network 118. Packet 68A is then routed to CNEDD 10G via gateway 54A, external network 56, and gateway 54B.

When CNEDD 10G receives packet 68A it decrylots the data field 70A, regenerating the original packet 68 sent by workstation 58A in network 116. CNEDD 10G then transmits the original packet 68 on its downstream port 14, and packet 68 is routed to workstation 58B.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments, and with various modifications as are suited to the particular use contemplated. It is intended that the scope of the invention be defined only by the appended claims.

What is claimed is:

1. In an apparatus for encrypting a first packet transmitted from a first computer network to a second computer network, wherein said first packet includes a header field containing information about the first packet and a data field containing data, said apparatus including a first network connection, a second network connection, data encryption means for encrypting said first packet, and memory means for storing matching criteria, said matching criteria including a list of source addresses and a list of destination addresses, and key information;

a method of operating said apparatus to selectively encrypt said first packet, said method comprising the steps of:

receiving said first packet from said first network via said first network connection;

extracting said information about the first packet from said header field of said first packet;

comparing said information about the first packet with said matching criteria to determine if said first packet is to be encrypted; and encrypting said first packet.

2. The method of claim 1 further including the step of: transmitting a second packet to said second network via said second network connection if said first packet has been encrypted, said second packet comprising a second header field containing information about the second packet, and a second data field containing said encrypted first packet.

3. The method of claim 1 further including the step of: transmitting said first packet to said second network via said second network connection if said first packet has not been encrypted.

4. In an apparatus for decrypting the data field of a second packet transmitted from a second computer network to a first computer network, wherein said second packet includes a header field containing information about the second packet and a data field containing data, said apparatus including a first network connection, a second network connection, data decryption means for decrypting said data field of said second packet, and memory means for storing matching criteria, said matching criteria including a list of source addresses and destination addresses, and key information;
- a method of operating said apparatus to selectively decrypt said data field of said second packet, said method comprising the steps of:
- receiving said second packet from said second network via said second network connection;
- extracting said information about the second packet from said header field of said second packet;
- comparing said information about the second packet with said matching criteria to determine if said data field of said second packet is to be decrypted; and
- decrypting said data field of said second packet.

5. The method of claim 4 further including the step of: transmitting a first packet to said first network via said first network connection if said data field of said second packet has been decrypted, said first packet comprising said decrypted data field of said second packet.

6. The method of claim 4 further including the step of: transmitting said second packet to said first network via said first network connection if said data field of said second packet has not been decrypted.

7. An apparatus for encrypting a first packet transmitted from a first computer network to a second computer network, wherein said first packet includes a header field containing information about the first packet and a data field containing data, said apparatus comprising:
- means for receiving said first packet from said first network;
- means, coupled to said means for receiving, for extracting said information about the first packet from said header field of said first packet;
- memory means for storing matching criteria, said matching criteria including a list of source addresses and destination addresses;
- means, coupled to said memory means, for comparing said information about the first packet extracted from said header field of said first packet with said matching criteria to determine if said first packet is to be encrypted; and
- means for encrypting said first packet.

8. The apparatus of claim 7 further including means for transmitting a second packet to said second network if said first packet has been encrypted, said second packet comprising a second header field containing information about the second packet, and a second data field containing said encrypted first packet.

9. The apparatus of claim 8 wherein said information about the second packet includes source and destination information.

10. The apparatus of claim 7 further including means for transmitting said first packet to said second network if said first packet has not been encrypted.

11. The apparatus of claim 7 wherein said information about the first packet includes destination information.

12. The apparatus of claim 7 wherein said matching criteria includes a list of destinations to which said data fields are encrypted.

13. The apparatus of claim 7 wherein said memory means also includes means for storing masking information, and said means for comparing includes means for masking said information about the first packet.

14. An apparatus for decrypting the data field of a second packet transmitted from a second computer network to a first computer network, wherein said second packet includes a header field containing information about the second packet and a data field containing data, said apparatus comprising:
- means for receiving said second packet from said second network;
- means, coupled to said means for receiving, for extracting said information about the second packet from said header field of said second packet;
- memory means for storing matching criteria, said matching criteria including a list of source addresses and destination addresses;
- means, coupled to said memory means, for comparing said information about the second packet extracted from said header field of said second packet with said matching criteria to determine if said data field of said second packet is to be decrypted; and
- means for decrypting said data field of said second packet.

15. The apparatus of claim 14 further including means for transmitting a first packet to said first network if said data field of said second packet has been decrypted, said first packet comprising the decrypted data field of said second packet.

16. The apparatus of claim 14 further including means for transmitting said second packet to said first network if said data field of said second packet has not been decrypted.

17. The apparatus of claim 14 wherein said information about the second packet includes source information.

18. The apparatus of claim 14 wherein said matching criteria includes a list of sources from which said data fields are decrypted.

19. The apparatus of claim 14 wherein said memory means also includes means for storing masking information, and said means for comparing includes means for masking said information about the second packet.

20. The apparatus of claim 7 or claim 14 wherein said apparatus is incorporated into a router.

21. The apparatus of claim 7 or claim 14 wherein said apparatus is incorporated into a media adaptor unit.

22. The apparatus of claim 7 or claim 14 wherein said apparatus is incorporated into a printer.

23. The apparatus of claim 7 or claim 14 wherein said apparatus is incorporated into a printer spooler.

24. The apparatus of claim 7 or claim 14 wherein said apparatus is incorporated into a modem.

25. The apparatus of claim 7 or claim 14 wherein said apparatus ms incorporated into a modem spooler.

26. The apparatus of claim 7 or claim 14 wherein said apparatus ms incorporated into a workstation.

27. The apparatus of claim 7 or claim 14 wherein said apparatus is incorporated into a personal computer.

28. The apparatus of claim 7 or claim 14 wherein said apparatus is incorporated into a laptop computer.

29. The apparatus of claim 7 or claim 14 wherein said apparatus ms incorporated into a multiport repeater.

30. The apparatus of claim 7 or claim 14 wherein said apparatus is incorporated into a microrepeater.

31. The apparatus of claim 7 or claim 14 wherein said apparatus ms incorporated into a network concentrator.

32. The apparatus of claim 7 or claim 14 wherein said apparatus is incorporated into a network multiplexer.

33. The apparatus of claim 7 or claim 14 wherein said apparatus is incorporated into an internetwork adaptor.

34. The apparatus of claim 7 or claim 14 wherein said apparatus is incorporated into a network bridge.

35. The apparatus of claim 7 or claim 14 wherein said apparatus is incorporated into a network repeater.

36. The apparatus of claim 7 or claim 14 wherein said apparatus is incorporated into a terminal.

37. The apparatus of claim 7 or claim 14 wherein said apparatus is incorporated into an X windows terminal.

38. The apparatus of claim 7 or claim 14 wherein said apparatus is incorporated into a disk drive.

39. The apparatus of claim 7 or claim 14 wherein said apparatus is incorporated into a CD ROM drive.

40. The apparatus of claim 7 or claim 14 wherein said apparatus is incorporated into a tape drive.

41. The apparatus of claim 7 or claim 14 wherein said apparatus is incorporated into a keyboard.

42. The apparatus of claim 7 or claim 14 wherein said apparatus is incorporated into a piece of testing or monitoring equipment.

43. The apparatus of claim 7 or claim 14 wherein said apparatus is incorporated into a file server.

44. The apparatus of claim 7 or claim 14 wherein said apparatus is incorporated into a remote system backup device.

45. The apparatus of claim 7 or claim 14 wherein said apparatus is incorporated into a gateway.

* * * * *